3,257,364
TELOMERIZATION OF ETHYLENE WITH OTHER OLEFINS

Gert G. Eberhardt, Philadelphia, Pa., assignor to Sun Oil Company, Philadelphia, Pa., a corporation of New Jersey
No Drawing. Filed June 28, 1963, Ser. No. 291,296
8 Claims. (Cl. 260—88.2)

This invention relates to the catalytic telomerization of ethylene with other olefins to form olefins of higher molecular weight. The products can range from liquids to solid waxes.

It has been proposed in Closson et al. United States Patent No. 2,751,426 to use hydrocarbo-alkali metal compounds as a catalyst to effect the alkylation of olefins containing allylic hydrogen with ethylene. For example, such patent discloses that ethylene and hexene-2 can be caused to react by means of sodio-hexene-1 to form $C_8$ olefins. The scope of the reaction is limited to the addition of only one ethylene molecule at any allylic position and no telomerization reaction can be effected by this type of catalyst.

I have now discovered that ethylene can be made to telomerize with olefins containing allylic hydrogen to form higher olefins varying from the 1:1 addition product to solid waxes having a wide range of molecular weights.

According to the invention ethylene is reacted with any non-conjugated, non-aromatic olefin which contains allylic hydrogen by contacting the hydrocarbons at a temperature in the range of 50–180° C. in the presence of a catalyst system prepared by combining a non-aromatic tertiary amine with LiR wherein R is a hydrocarbon radical having 1–30 carbon atoms selected from the group consisting of alkyl, cycloalkyl, aryl, aralkyl and alkenyl. This type of catalyst system initially causes transmetallation of the lithium atom from the catalyst to an allylic position of the olefin and thereafter a growth reaction takes place wherein ethylene molecules combine with the resulting organo-lithium compound at the site of the lithium atom. This growth or propagation reaction is opposed by a further transmetallation reaction wherein the lithium atom eventually transfers with an allylic hydrogen atom of another molecule of the starting olefin and the cycle repeats itself. The average molecular weight of the products obtained is determined by the relative rates of the opposing propagation and transmetallation reactions.

By "allylic hydrogen" as used herein is meant hydrogen atoms directly attached to a carbon atom which is alpha to an olefinic double bond. Thus in pentene-2 the two hydrogen atoms at the 4-position as well as the three hydrogen atoms at the 1-position are allylic. The present process can be practiced with any non-conjugated, non-aromatic olefin that contains allylic hydrogen including monoolefins and polyolefins, and there is no actual upper limit in the number of carbon atoms that the olefin may contain per molecule as long as it is in liquid phase under the reaction conditions. Cyclic as well as non-cyclic olefins can be utilized but conjugated diolefins should not be employed.

As a specific example of the invention, lithium butyl is dissolved in a saturated hydrocarbon solvent, e.g., hexane, in a concentration of two grams per liter and a chelating diamine, such as N,N'-tetramethyl-1,2-diaminooctane, is added in amount of at least one mole per mole of lithium butyl. Butene-2 is added and the mixture is contacted at 115° C. with ethylene at a pressure of 700 p.s.i.g. Thereafter the mixture is worked up to recover the telomer, whereby olefinic products ranging from $C_6$ to solid waxes are obtained.

The catalyst for practicing the present process can be formed in situ in the reaction medium prior to contacting it with the ethylene or it can be separately pre-formed and subsequently added to the reaction medium. The reaction medium can be an excess amount of the starting olefin or a saturated liquid hydrocarbon which can be either paraffinic or naphthenic or both can be utilized. A mixture of saturated hydrocarbons, such as the saturate fraction of naphtha or isobutane-butylene alkylate, can be employed. As previously indicated, the essential ingredients of the catalyst are a hydrocarbo-lithium compound having 1–30 carbon atoms and a non-aromatic tertiary amine. These components when admixed form coordination compounds which are the active catalyst species. The R group of the lithium compound can be any hydrocarbon radical of the specified number of carbon atoms including aliphatic, cycloaliphatic, aryl, alkaryl and alkenyl groups. The following are examples of suitable R groups for the LiR component: ethyl, propyl, isopropyl, n-butyl, isobutyl, tertiary butyl, n-amyl, isoamyl, n- or isooctyl, n- or isodecyl, lauryl, cyclopentyl, methylcyclohexyl, phenyl, benzyl, tolyl, xylyl, cumyl, methylbenzyl, propylbenzyl, 2-phenylethyl, allyl, crotonyl and the like. Preferably LiR is an alkyl lithium in which the alkyl group has 2–10 carbon atoms.

The amine component of the catalyst system can be any tertiary amine which is non-aromatic, including polyamines as well as monoamines. Preferably amines are used in which there are a sufficient number of carbon atoms to render the complex that forms between the amine and LiR soluble in the reaction mixture. While any non-aromatic tertiary amine will, in combination with the hydrocarbo-lithium component, form a catalyst system that is operative for effecting the telomerization reaction, certain types of amines produce the most active catalysts and hence are preferred. Best results generally are obtained with chelating diamines, i.e., diamines in which the two nitrogen atoms are so spaced in the molecule that the diamine can form a chelate with the lithium component of the catalyst. These chelating amines can be of either of two sub-types depending upon whether the molecular structure is flexible or rigid. Examples of the flexible sub-type are as follows: N,N'-tetraethylethylene diamine; N,N'-tetrapropylethylene diamine; and N,N'-tetramethyl-1,2-diaminodecane. The following are examples of the rigid sub-type in which the nitrogen atoms are so positioned with respect to each other that metal chelates can readily be formed in spite of the lack of flexibility in the molecular structure:

N,N'-tetraalkyl-1,2-diaminocyclohexane

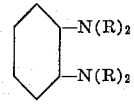

N,N'-dialkylbispidin

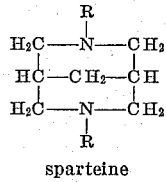

sparteine

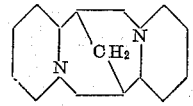

Chelates formed from diamines of the latter sub-type have particularly good stability and high catalytic activity.

Another type of amine for use in practicing the invention comprise amines in which one or more of the nitrogen atoms are at a bridgehead position, by which is meant that all three valences of the nitrogen participate in ring systems. An example of this type of amine is triethylene diamine, which also can be designated 1,4-diaza[2.2.2]bicyclooctane, which has the following structure:

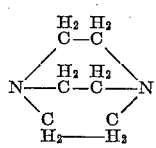

These bridgehead type amines are non-chelating but nevertheless form coordination complexes with the LiR component that have good catalytic activity and stability. Another amine of the bridgehead type is quinuclidine or 1,4-ethylene piperidine, which has a structure like the foregoing except that one of the nitrogen atoms is replaced by a CH group. Still other examples are the aza-admantanes which structurally resemble adamantane except that one or more nitrogen atoms are substituted at bridgehead positions in place of carbon.

Non-aromatic tertiary amines other than the chelating and bridgehead types discussed above also can be used in practicing the invention although they generally produce catalysts which have lower activity and stability and hence are not preferred. Examples of such other tertiary amines that can be used are triisobutyl amine, tridecylamine, trilaurylamine, N,N' - tetramethylhexamethylene diamine, N,N' - dimethylpiperazine, N-methylpiperidine, N-ethylpiperidine, N-ethylpyrrolidine and the like.

The proportion of the tertiary amine to the lithium compound incorporated in the reaction mixture can vary widely. For example, the amounts of these catalyst components used can be such that the atomic ratio of nitrogen to lithium (N:Li) in the catalyst system varies from 0.1: to 100:1. In fact the amine can be used as the reaction medium or solvent in place of a saturated hydrocarbon, although this generally is not desirable because of its relatively high cost. A more desirable range of atomic ratios of N:Li within which to operate is from 0.5:1 to 20:1 and it is preferable to employ the amine in at least the stoichiometric amount for forming its coordination complex with the LiR component. For chelating amines of the molecularly rigid sub-type little if any advantage is gained by using more than the stoichiometric amount. However for other types of amines better catalyst activity and longer life often can be obtained by utilizing a substantial excess of the amine relative to the lithium component, for example, 5–10 times the stoichiometric amount required for forming the coordination complex.

In effecting the telomerization reaction ethylene is contacted with the reaction mixture containing the other olefin and the catalyst prepared as described above. The reaction temperature should be in the range of 50–180° C., more preferably 80–150° C. and still more preferably 100–130° C. The reaction proceeds slowly if the ethylene is at atmospheric pressure and the reaction rate increases as the pressure is increased. Hence it is desirable to use a pressure in excess of 50 p.s.i.g. and considerably higher pressures can be used if desired, for example, 500–2000 p.s.i.g. or even much higher pressures such as 20,000 p.s.i.g. The reactor should be provided with agitation means for effecting intimate contact between the ethylene phase and the liquid reaction mixture. Ethylene can be added to the reactor continuously or intermittently as it is consumed to maintain the pressure at about the desired level.

In carrying out the reaction precautions should be taken to exclude air and moisture from the system to avoid poisoning of the catalyst. Hydrogen also acts as a catalyst poison and hence the ethylene used should not contain free hydrogen.

As the telomerization reaction proceeds the activity of the catalyst tends to decrease and eventually will reach a low enough level that it is no longer feasible to continue the reaction. The catalyst then can be completely deactivated by contacting the mixture with water. This will break the catalyst complex, releasing the amine and converting the lithium into lithium hydroxide. The latter will dissolve in the water phase and can be removed therewith. In cases where a water soluble amine was used to form the catalyst, the amine will also dissolve in the water phase and can be recovered therefrom by distillation. However it is distinctly preferable to employ higher molecular weight amines which are preferentially soluble in hydrocarbons, in which case the amine can be recovered from the hydrocarbon phase by extraction with aqueous mineral acid and the amine salt can then be decomposed by addition of caustic soda to recover the amine. If desired the catalyst can also be deactivated by substituting alcohol for water. The waxy product formed in the reaction is mainly insoluble at room temperature in the saturated hydrocarbon reaction medium and hence can be recovered therefrom by filtration. The total hydrocarbon product can be separated into suitable fractions as desired by distillation.

As previously indicated, the mechanism of the overall reaction involves two distinctly different types of reactions, namely, a transmetallation or chain transfer reaction and a chain propagation reaction. The first step in initiating the reaction involves the transfer of a lithium atom from the catalyst complex to the starting olefin and replacement of an allylic hydrogen atom therein by the Li. The next step involves the propagation or chain growth whereby ethylene molecules telomerize with the thus formed organo-lithium compound. The first ethylene propagation step appears to occur via two competing mechanisms. One involves a six-membered transition state and can be illustrated as follows for the reaction of one molecule of ethylene with butene-2:

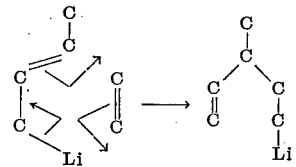

After the initial propagation as illustrated above, growth can then continue by the addition of ethylene molecules between the lithium atom and the carbon atom to which it is attached. The other mechanism by which propagation can occur involves straight addition of ethylene molecules at the site of the lithium atom as illustrated below for the reaction of ethylene with butene-2:

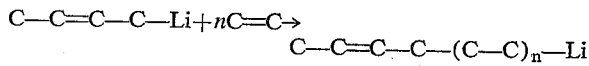

Finally the telomerization reaction effected by either mechanism will terminate for any particular molecule undergoing propagation due to transmetallation whereby the Li atom at the end of the chain transfers with an allylic hydrogen atom from another molecule of the starting olefin in the same manner as initially occurred. The newly formed organo-lithium molecule then undergoes the chain growth in a new reaction cycle and the cycles repeat themselves until the catalyst becomes inactive through some other mechanism. Thus it can be seen that the overall reaction is truly catalytic, so that the catalyst theoretically would last forever. As a practical matter, the reaction is conducted until a satisfactorily high yield of higher olefinic products has been obtained, the catalyst is then deactivated as previously described and the reaction mixture is worked up to recover the products.

The length of chain growth and hence the average molecular weight of the reaction products formed in the process can be controlled by appropriate regulation of the process variables. The product molecular weight obtained depends upon the rate of the propagation reaction relative to the rate of the transmetallation reaction, since the latter functions to terminate the former. The rate of propagation depends largely on the ethylene pressure employed, while the transmetallation reaction is unaffected by ethylene pressure. Hence the average molecular weight of the product can be increased by raising the ethylene pressure. On the other hand the rate of transmetallation increases with increasing concentration of the charge olefin in the reaction mixture. Thus the average length of the telomerization chain can also be increased by reducing the charge olefin concentration, for example, by incorporating in the reaction mixture an inert hydrocarbon such as hexane, cyclohexane, octane or the like. The effect of increasing reaction temperature is to increase the rates of propagation and transmetallation approximately equally, so that the overall reaction rate is increased without substantial alteration of the average chain length of the product.

From the above-described mechanisms by which telomerization can occur in the present process, it can be seen that products of different structures may be formed during the reaction. For example, $C_6$ product formed from ethylene and butene-2 by the six-membered transition state mechanism will be a branched chain terminal olefin, namely, 2-methylpentene-1, while that formed by the other mechanism will be a straight chain internal olefin, viz, hexene-2. Whenever the six-membered transition state can occur, that mechanism seems to be favored and the major portion of the product will have the structure that results from it. However, for certain olefins such as propylene or isobutene, the telomerization products formed by either mechanism are the same.

The following examples illustrate the invention more specifically. In each of these examples a rigid chelating type of amine, namely, the alkaloid sparteine ($C_{15}H_{26}N_2$), was used in preparing the catalyst.

*Example I.—Telomerization of ethylene with isobutene*

The reactor used was a 150 ml. rocking-type autoclave containing a batch of steel balls to provide better agitation. The reactor was flushed with an inert gas and then 25 ml. of hexane as solvent, 0.5 g. of n-butyl lithium and 3 ml. of sparteine were added to it. The atomic ratio of N:Li was approximately 4:1. Then 30 g. of purified anhydrous isobutene were condensed into the autoclave, the autoclave was heated to 110° C. while shaking and ethylene was admitted until the total pressure was about 600 p.s.i.g corresponding to an ethylene partial pressure of about 400 p.s.i. The pressure was maintained in the neighborhood of 600 p.s.i.g. throughout the reaction by admitting ethylene as it was consumed. The reaction was allowed to proceed for 30 minutes during which time about 25 g. of ethylene were consumed. Although at the end of this time the catalyst was still quite active, nevertheless the reaction was stopped since the degree of conversion was sufficient to yield adequate product for determining what reactions had taken place. The reactor was then cooled down and residual gas was vented. Methanol was added to destroy the catalyst and the hydrocarbon phase was washed with dilute hydrochloric acid. Fractional distillation yielded about 14 g. of liquid olefins boiling from the $C_6$ range up to 130° C. at 2 mm. Hg and 18 g. of a white wax residue which was solid at room temperature. By vapor phase chromatography it was found that 2-methylpentene-1 constituted about 85% of the $C_6$ portion of the liquid product. For the waxy product the infrared spectrum showed absorption bands typical for terminal isobutenyl groups.

*Example II*

When Example I was repeated except that the total pressure was reduced to 500 p.s.i.g. (ethylene partial pressure=about 300 p.s.i.) a liquid olefin fraction boiling up to 130° C. at 2 mm. Hg and a residual wax fraction were again produced but in approximately equal weight amounts. Comparison of these two examples shows that an increase in the ethylene partial pressure tends to shift the molecular weight distribution upwardly.

*Example III.—Telomerization of ethylene with butene-2*

The procedure was generally similar to that described in Example I but using in this case a 300 ml. rocking-type autoclave. The reaction mixture contained 40 ml. of hexane, 0.5 g. of n-butyl lithium, 3 ml. of sparteine and 83 g. of purified butene-2. The temperature was 110° C. and the total pressure was maintained at 450 p.s.i.g. The reaction period was 2 hours at the end of which time only a slight decrease in reaction rate had been noted. The product was worked up in the same manner as before and there were obtained 26 g. of liquid olefins boiling from the $C_6$ range up to 150° C. at 2 mm. Hg and 27 g. of a white wax residue. Vapor phase chromatography showed that 3-methylpentene-1 constituted about 65% of the $C_6$ portion of the liquid product, thus indicating that the reaction proceeded mainly by the six-membered transition state mechanism previously discussed. The infrared spectrum of the waxy product showed the presence of terminal vinyl groups.

*Example IV.—Telomerization of ethylene with cyclohexene*

The reaction mixture contained 75 ml. of cyclohexene, 0.5 g. of butyl lithium and 2.5 ml. of sparteine. Reaction conditions included a temperature of 110° C. and a total pressure of 250 p.s.i.g. At the end of 1 hour 40 g. of ethylene had been consumed. The product contained 12 g. of liquid olefins boiling up to 150° C. at 3 mm. Hg and 36 g. of waxy residue. The infrared spectrum showed internal olefinic unsaturation.

*Example V.—Telomerization of ethylene with propylene*

The reaction mixture contained 60 ml. of hexane as solvent, 0.6 g. of butyl lithium, 5 ml. of sparteine and 60 g. of propylene. Ethylene was continuously pressured into the reactor to maintain total pressure at 1200 p.s.i.g. and the ethylene partial pressure was about 500 p.s.i. The temperature was 110° C. and the reaction was allowed to proceed for 3 hours after which the product was worked up as before. There were obtained 20 g. of liquid product boiling from the $C_5$ range up to 150° C. at 1 mm. Hg and 30 g. of waxy residue. Infrared analysis indicated that about 70% of the liquid product was straight chain terminal olefins such as pentene-1, heptene-1, nonene-1, etc.

When other hydrocarbo-lithium compounds as herein defined are substituted for butyl lithium, substantially similar results are obtained. Also when other amines as herein defined are substituted for the amines used in the preceding examples, analogous reactions are obtained although, as previously discussed, the efficacy of the catalyst system formed can vary considerably depending upon the particular type of amine selected. Likewise, when other non-conjugated olefins are employed, analogous reactions occur. On the other hand, when butyl lithium is employed under conditions as described in the above examples except that no tertiary amine is included in the system, substantially no reaction occurs.

Catalyst systems of the type employed in the present invention have been disclosed and claimed in my co-pending application Serial No. 202,678, filed June 15, 1962, and now abandoned, which also discloses and claims their use in telomerizing ethylene with aromatic hydrocarbons to produce alkyl aromatics such as 1-phenylalkanes. My copending application Serial No. 279,341, filed May 9, 1963, discloses and claims the use of the same type of catalyst system for polymerizing ethylene alone to form polyethylene waxes.

I claim:
1. Method of telomerizing ethylene with olefinic hydrocarbons which comprises contacting ethylene at a temperature in the range of 50–180° C. with a non-aromatic, non-conjugated olefinic hydrocarbon containing at least one allylic hydrogen atom in the presence of a catalyst prepared by combining a non-aromatic tertiary amine with LiR wherein R is a hydrocarbon radical having 1–30 carbon atoms selected from the group consisting of alkyl, cycloalkyl, aryl, aralkyl and alkenyl, and separating from the reaction mixture a telomerization product each molecule of which contains only one moiety derived from said non-aromatic, non-conjugated olefinic hydrocarbon.

2. Method according to claim 1 wherein said temperature is in the range of 80–150° C. and the ethylene is contacted at a pressure of at least 50 p.s.i.g.

3. Method according to claim 1 wherein said amine is a chelating diamine.

4. Method according to claim 3 wherein said temperature is in the range of 80–150° C. and the ethylene is contacted at a pressure of at least 50 p.s.i.g.

5. Method according to claim 4 wherein said amine is sparteine.

6. Method according to claim 1, wherein said amine contains bridgehead nitrogen.

7. Method according to claim 6 wherein said temperature is in the range of 80–150° C. and the ethylene is contacted at a pressure of at least 50 p.s.i.g.

8. Method according to claim 1 wherein R is an alkyl radical.

References Cited by the Examiner

UNITED STATES PATENTS

| | | | |
|---|---|---|---|
| 2,932,633 | 4/1960 | Juveland | 260—94.9 |
| 3,029,231 | 4/1962 | Van Amerongen | 260—87.5 |
| 3,036,056 | 5/1962 | Rion | 260—94.9 |

FOREIGN PATENTS 614,149   2/1962   Belgium.

JOSEPH L. SCHOFER, *Primary Examiner.*

M. B. KURTZMAN, *Assistant Examiner.*